United States Patent

Meyer et al.

(10) Patent No.: US 6,251,837 B1
(45) Date of Patent: Jun. 26, 2001

(54) HYDROSOLUBLE SILANE OR SILOXANE DERIVATIVE-BASED COPOLYMER

(75) Inventors: Véronique Meyer, Rueil Malmaison; Annie Audibert-Hayet, Croissy sur Seine; Patrick Gateau, Maurepas; Jean-Pierre Durand, Chatou; Jean-François Argillier, Suresnes, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/129,128

(22) Filed: Aug. 4, 1998

(30) Foreign Application Priority Data

Aug. 4, 1997 (FR) .................................. 97 10060

(51) Int. Cl.$^7$ .............................. C09K 3/00; C09K 7/02; E21B 33/00; C07K 7/04
(52) U.S. Cl. ........................... 507/233; 507/926; 556/450
(58) Field of Search .................... 507/233, 926; 556/450

(56) References Cited

U.S. PATENT DOCUMENTS

| | | | |
|---|---|---|---|
| 3,808,178 | * | 4/1974 | Gaylord ............................. 526/279 |
| 4,246,389 | | 1/1981 | LeBoeuf ............................ 526/279 |
| 4,743,667 | * | 5/1988 | Mizutani et al. ................... 526/245 |
| 4,780,515 | * | 10/1988 | Deichert ............................ 526/245 |
| 5,156,914 | * | 10/1992 | Shih ............................. 428/402.22 |
| 5,214,095 | * | 5/1993 | Lavoie .............................. 524/806 |
| 5,770,669 | * | 6/1998 | Robertson et al. ................. 526/279 |

FOREIGN PATENT DOCUMENTS

| | | |
|---|---|---|
| 0 377 188 | 7/1989 | (EP) . |
| 0408311 | * 1/1991 | (EP) . |
| 0661379 | * 7/1995 | (EP) . |
| 80/00253 | 2/1980 | (WO) . |

OTHER PUBLICATIONS

Patent Abstracts of Japan, vol. 096, No. 006, Jun. 28, 1996 (JP 08 053520 A).
Database WPI, AN 92–427149, Section Ch, Wk. 9252, Derwent Publications Ltd., London, GB (JP 04 321 618 A).
Database WPI, AN 93–071004, Section Ch., Wk. 9309, Derwent Publications Ltd., London, GB (JP 05 017 324 A).
Database WPI, AN 94–097764), Section Ch., Wk. 9412, Derwent Publications Ltd., London, GB (JP 06 048 923 A).
Database WPI, AN 92–091903, Section Ch., Wk. 9212, Derwent Publications Ltd., London, GB (JP 04 034 405 A).

* cited by examiner

*Primary Examiner*—Jill Warden
*Assistant Examiner*—LaToya I. Cross
(74) *Attorney, Agent, or Firm*—Millen, White, Zelano & Branigan, P.C.

(57) ABSTRACT

Hydrosoluble copolymers made of hydrophilic monomers, e.g., acrylamide, and of silane or siloxane derivative-based hydrophobic monomers, e.g., a silane or or siloxane acrylate, is obtained by micellar or heterogeneous radical copolymerization, and such copolymers can be used as rheology control agents in, e.g., a well bore.

24 Claims, 1 Drawing Sheet

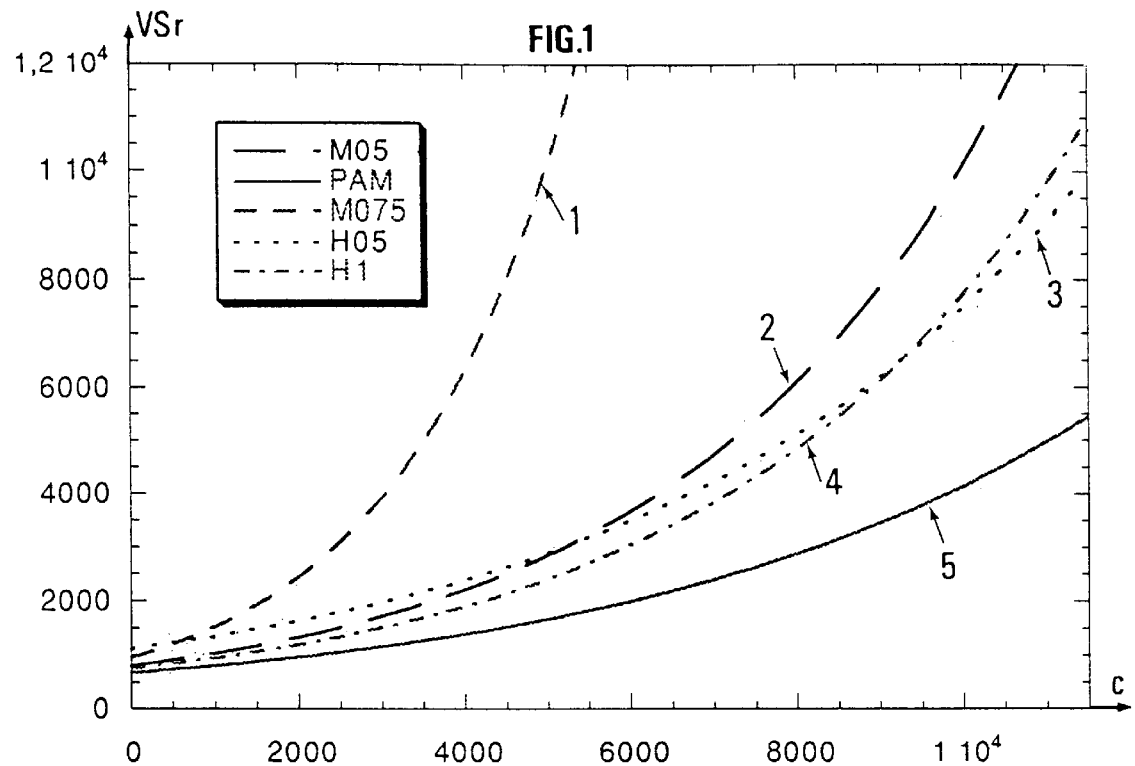
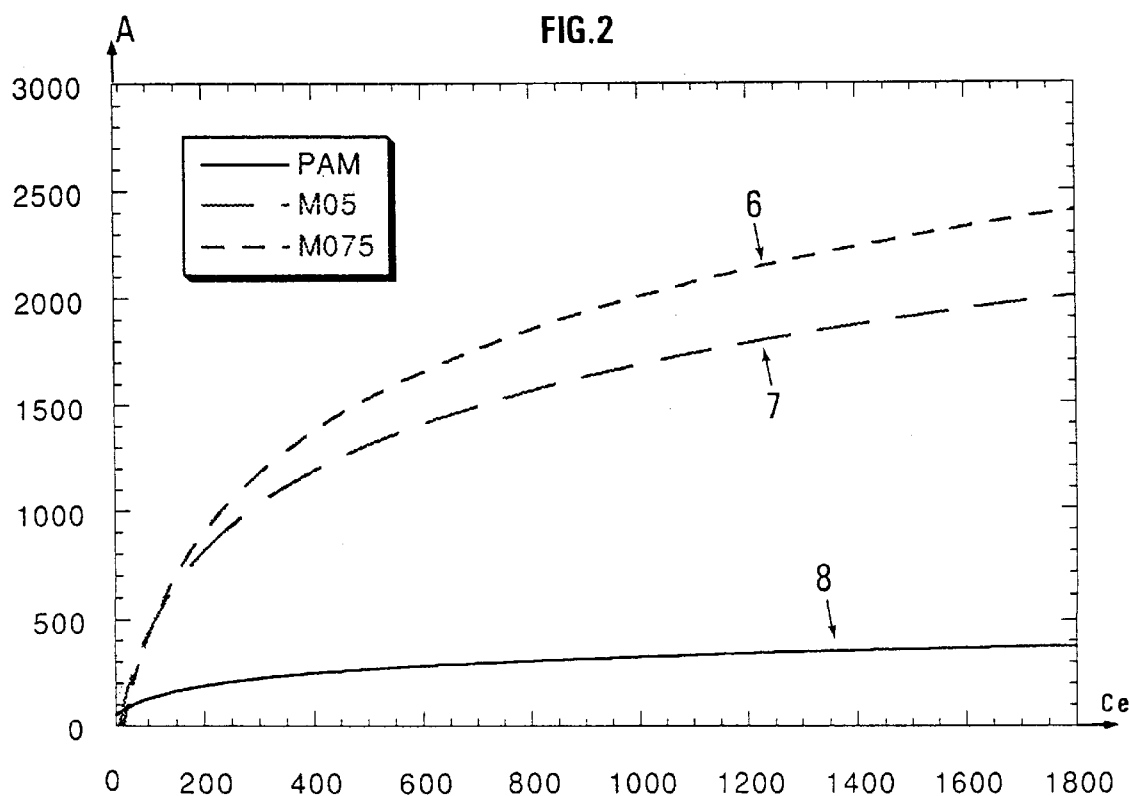

HYDROSOLUBLE SILANE OR SILOXANE DERIVATIVE-BASED COPOLYMER

FIELD OF THE INVENTION

The present invention relates to new associating hydrosoluble polymers intended for various applications, for example well fluids, paints, the cosmetics industry, the paper industry. Associating polymers consist of a hydrosoluble skeleton comprising a small amount of hydrophobic groups. They are mainly used as thickening agents for rheology control of aqueous suspensions. The polymers according to the present invention have shown very interesting properties as viscosifiers and, furthermore, an adsorption power that permits the contemplation of other applications, for example as filtrate reducer, swelling inhibitor or argillaceous rock cleavage inhibitor, or for cuttings dispersion control.

It is well-known that hydrophobic monomers generally consist of a hydrocarbon or perfluorocarbon chain. The copolymers of the present invention are made of a hydrophilic monomer of acrylamide type for example and of a silane or siloxane derivative-based hydrophobic monomer. The temperature stability of the siloxane bonds should favour the thermal stability in solution of the copolymer of the present invention.

SUMMARY OF THE INVENTION

The present invention thus relates to a hydrosoluble copolymer obtained from hydrophilic monomers and hydrophobic monomers having at least one of the following general formula structures a, b or c:

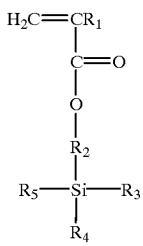  a)

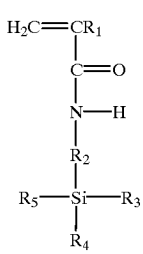  b)

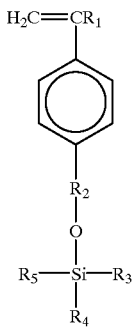  c)

$R_1 = H, CH_3$
$R_2 = (CH_2)_n$     $0 < n < 10$ $R_3, R_5 = \begin{cases} C_mH_{2m+1} & 0 < m < 6 \\ C_kH_{2k+1} & 0 < k < 10 \\ (OSi)_xC_jH_{2j+1} & 0 < j < 10 \quad 0 < x < 40 \\ C_dH_{2d+1} & 0 < d < 10 \end{cases}$ $R_4 = C_bH_{2b+1}$     $0 < b < 10$ The proportion of hydrophobic monomer is less than 10% by mole.

In the copolymer, the hydrophobic monomer can have the following general formula:

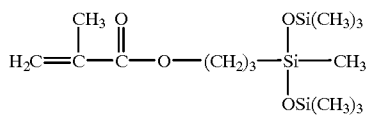

According to the invention, the hydrophobic monomers can be acrylamide.

The copolymer according to the invention can be obtained by means of a radical, for example micellar copolymerization process.

In the micellar copolymerization process, dodecyl sodium sulfate can be used as surfactant.

The copolymer according to the invention can also be obtained by heterogeneous copolymerization.

The copolymer can have a molecular weight substantially ranging between $10^4$ and $5·10^6$.

In a variant, the copolymer can have a molecular weight substantially ranging between $5·10^5$ and $5·10^6$, and have at most 2% by mole of hydrophobic monomers.

In another variant, the copolymer can have a molecular weight substantially ranging between $10^4$ and $10^6$, and have from 2% to 10% by mole of hydrophobic monomers.

The copolymer can be dissolved in aqueous fluids in a proportion ranging between 0.1 and 15% by weight, said fluids being used in circulation in a wellbore, for example as drilling fluids, completion or workover fluids, fracturing, sweep fluids, or cement slurry.

The invention also relates to an application of the copolymer for rheology control of an aqueous fluid.

BRIEF DESCRIPTION OF THE DRAWINGS

Other features and advantages of the present invention will be clear from reading the description hereafter of processes allowing to obtain the copolymer, characterization tests and characteristics measurements, with reference to the accompanying drawings wherein:

FIG. 1 gives the compared rheological characteristics of various copolymers as a function of the concentration thereof in solution, FIG. 2 gives the adsorption results of a copolymer according to the invention.

DETAILED DESCRIPTION OF THE INVENTION

The polyacrylamide is generally prepared by radical polymerization in aqueous solution. The hydrophobic monomers are insoluble in such a reaction medium. In radical copolymerization, the polymer is prepared in a single stage by copolymerization of the hydrophilic monomer with the hydrophobic monomer. In order to overcome the insolubility problem of the hydrophobic monomer, various synthesis methods can be used:

emulsification of the hydrophobic monomers in the presence of small surfactant amounts;

solubilization of the hydrophobic monomer in surfactant micelles dispersed in water (micellar copolymerization), as taught in documents U.S. Pat. Nos. 4,432,88 1 or 4,520,182 mentioned here by way of reference;

presence of the insoluble hydrophobic monomer in the form of a fine suspension (heterogeneous copolymerization) according to "HILL A., CANDAU F., SELB J., Macromolecules, 1993, 4521–4531, Properties of Hydrophobically Associating Polyacrylamides: Influence of the Method of Synthesis", mentioned here by way of reference;

copolymerization in solution in the presence of a solvent or of a mixture of solvents of both monomer types.

The following, non limitative examples describe various processes for obtaining the copolymer according to the invention. Example 1 gives a process allowing to obtain a polyacrylamide (PAM) whose characteristics are compared to those of the copolymer according to the invention.

EXAMPLE 1

21 g of acrylamide and 669 g of purified water are fed into a I liter reactor. The reaction medium is placed in an inert atmosphere (argon) and brought to a temperature of 50° C.

0.15 g of potassium persulfate dissolved in 10 g of water are fed into the reactor. The reaction medium is kept under stirring at 50° C. for 6 hours. The reaction medium is then precipitated in a large methanol excess. The polymer obtained is filtered and washed three times with methanol, then vacuum dried at 50° C.

20.4 g of polymer bearing reference PAM is obtained, whose average molecular weight of $2.5 \cdot 10^6$ g.mol$^{-1}$ is measured by light scattering in formamide.

EXAMPLE 2

Micellar Copolymerization 20.5 g of acrylamide, 669 g of purified water and 20.3 g of dodecyl sodium sulfate are fed into a 1 liter reactor.

0.5 g of 3-methacryl-oxypropylbis(trimethylsiloxy) methylsilane are added to the reaction medium while stirring. The reaction medium is placed in an inert atmosphere (argon) and brought to a temperature of 50° C.

0.15 g of potassium persulfate dissolved in 10 g of water are fed into the reactor. The reaction medium is kept under stirring at 50° C. for 6 hours. The copolymer obtained is recovered and purified according to the method described in example 1.

19.8 g of copolymer bearing reference M05 and containing 0.5% by mole of hydrophobic groups are obtained, with an average molecular weight of $3.2 \cdot 10^6$ g.mol$^{-1}$ measured by light scattering in formamide.

EXAMPLE 3

Micellar Copolymerization

If in example 2, all other things being equal, we copolymerize 20.25 g of acrylamide and 0.75 g of 3-methacryl-oxypropylbis(trimethylsiloxy) methylsilane, we obtain 19.5 g of a copolymer bearing reference M075, containing 0.75% by mole of hydrophobic groups and whose average molecular weight, measured by light scattering in formamide, is $2.9 \cdot 10^6$ g.mol$^{-1}$.

EXAMPLE 4

Heterogeneous Copolymerization

Example 2 is repeated without using a surfactant. The copolymer obtained after purification, bearing reference H05, contains 0.5% of hydrophobic monomers and its average molecular weight is $3.0 \cdot 10^6$ g.mol$^{-1}$.

EXAMPLE 5

Heterogeneous Copolymerization

If in example 4, all other things being equal, we copolymerize 20 g of acrylamide and 1 g of 3-methacryl-oxypropylbis(trimethylsiloxy) methylsilane, we obtain 18.75 g of a copolymer bearing reference M075 and containing 1% by mole of hydrophobic groups, its average molecular weight measured by light scattering in formamide being $3.1 \cdot 10^6$ g.mol$^{-1}$.

EXAMPLE 6

Rheological Properties

The various polymers obtained in examples 1 to 5 are brought into solution in water at different concentrations ranging between 100 and 10,000 ppm.

The absolute viscosities of these solutions are measured by means of a Couette type low-shear viscometer at a temperature of 30° C. and at velocity gradients ranging between 0.017 and 128 s$^{-1}$. The reduced specific viscosity VSr in cm$^3$.g$^{-1}$ is calculated and plotted against the polymer concentration in ppm in FIG. 1. Curves 1, 2, 3, 4 and 5 represent copolymers M075, M05, H05, H1 and PAM respectively.

For a given concentration, the copolymers obtained according to the invention by micellar copolymerization (M075 and M05) are much more viscous than the polyacrylamide (PAM). It can be noted that the viscosifying power of the copolymer solution is all the higher as the percentage by mole of hydrophobic monomer increases.

The products obtained by heterogeneous copolymerization (H05 and H1) also have enhanced viscosifying properties compared to the polyacrylamide (PAM). It can be noted that the percentage by mole of hydrophobic monomer does not substantially modify the viscosity of the solutions.

7) Adsorption Properties

In order to evaluate the adsorption properties, a comparative study has been made between polyacrylamide and copolymers according to the invention in solution in contact with a clay (homo-ionic montmorillonite in which there are only potassium counterions left after a calcium ion exchange) by means of the remainder method. The adsorption isotherms are obtained by measuring the amount adsorbed on mixtures of montmorillonite dispersed in the water and of polymer solution. The polymer concentration varies whereas the solid/liquid ratio remains constant ($3.6 \cdot 10^4$). All the isotherms have been obtained under the same conditions: T=40° C., [KCl]=20 g/l, i.e. 0.27 mol/l, pH=8 and t=24 hours.

In FIG. 2, the polymer equilibrium concentration Ce (ppm) is laid off as abscissa and the adsorbed amount A (in milligram of polymer per gram of rock) is laid off as ordinate. Curves 6, 7 and 8 relate to M075, M05 and PAM respectively. It is clear that the copolymers according to the invention have a markedly increased adsorption power in relation to the PAM.

Such a copolymer can be used in aqueous solution as a drilling, completion, workover, fracturing or cementing fluid. More generally, it can be used in applications where it is necessary to control the rheology of an aqueous fluid containing a certain proportion of solid particles, under the pressure and temperature conditions which can be encountered in petroleum wells.

Of course, the applications of the copolymer according to the invention are not limited to those described above. This product can also be used as a thickening or viscosifying agent.

What is claimed is:

1. A hydrosoluble copolymer obtained by copolymerizing a hydrophilic monomer with hydrophobic monomer having at least one of the following general formula structures (a), (b) or (c):

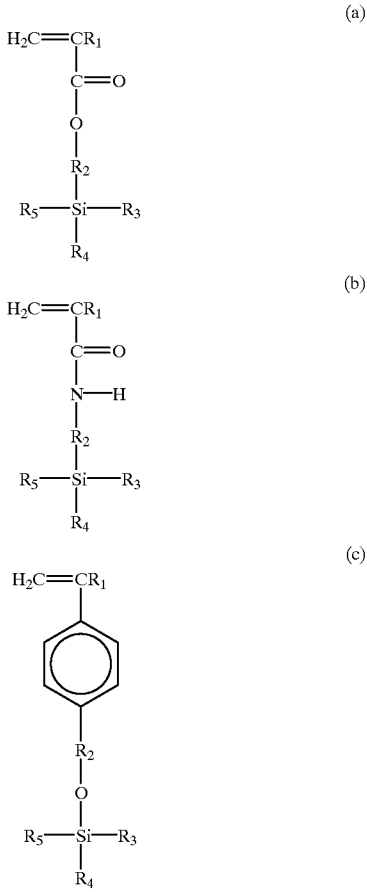

wherein $R_1$ = H or $CH_3$ $R_2 = (CH_2)_n$     $0 < n < 10$ $$R_3, R_5 = \begin{cases} C_mH_{2m+1} & 0 < m < 6 \\ \text{or} & \\ C_kH_{2k+1} & 0 < k < 10 \\ | & \\ (OSi)_xC_jH_{2j+1} & 0 < j < 10 \quad 0 < x < 40 \\ | & \\ C_3H_{2d+1} & 0 < d < 10 \end{cases}$$

$R_4 = C_dH_{2d+1}$     $0 < d < 10$ and wherein the proportion of hydrophobic monomers is less than 10% by mole.

2. A copolymer as claimed in claim 1, wherein the hydrophobic monomer has the following general formula:

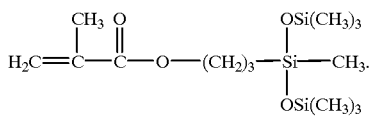

3. A copolymer as claimed in claim 1 wherein the hydrophilic monomer is acrylamide.

4. A copolymer as claimed in claim 1, obtained by means of a radical copolymerization process.

5. A copolymer as claimed in claim 1, obtained by a micellar copolymerization process.

6. A copolymer as claimed in claim 5, wherein in said micellar copolymerization process, dodecyl sodium sulfate is present as a surfactant.

7. A copolymer as claimed in claim 1, obtained by heterogeneous copolymerization.

8. A copolymer as claimed in claim 1, having a molecular weight ranging from about $10^4$ to $5 \cdot 10^6$.

9. A copolymer as claimed in claim 8, having a molecular weight ranging from about $5 \cdot 10^5$ to about $5 \cdot 10^6$, and containing at most 2% by mole of hydrophobic monomers.

10. A copolymer as claimed in claim 8, having a molecular weight ranging from about $10^4$ to $10^6$, and containing 2% to 10% by mole of hydrophobic monomers.

11. A copolymer as claimed in claim 2, wherein the hydrophobic monomer is acrylamide.

12. A copolymer as claimed in claim 8, wherein the hydrophobic monomer is acrylamide.

13. A copolymer as claimed in claim 9, wherein the hydrophobic monomer is acrylamide.

14. A copolymer as claimed in claim 10, wherein the hydrophobic monomer is acrylamide.

15. A copolymer as claimed in claims 11, having a molecular weight ranging from about $5 \cdot 10^5$ to about $5 \cdot 10^6$, and containing at most 2% by mole of hydrophobic monomers.

16. A copolymer as claimed in claim 3, wherein said hydrophobic monomer has structural formula (a).

17. A copolymer as claimed in claim 3, wherein said hydrophobic monomer has structural formula (b).

18. A copolymer as claimed in claim 3, wherein said hydrophobic monomer has structural formula (c).

19. A composition containing a copolymer as claimed in claim 1, dissolved in aqueous fluids in a proportion ranging between 0.1 and 15% by weight.

20. A composition containing a copolymer as claimed in claim 3, dissolved in aqueous fluids in a proportion ranging between 0.1 and 15% by weight.

21. In a method of of controlling the rheology of an aqueous fluid comprising introducing a rheology-controlling agent to said aqueous fluid, the improvement comprising adding as said rheology-controlling agent a copolymer according to claim 1 to the aqueous fluid.

22. In a method of controlling the rheology of an aqueous fluid comprising introducing a rheology-controlling agent to said aqueous fluid, the improvement comprising adding as said rheology-controlling agent a copolymer according to claim 20 to the aqueous fluid.

23. A method of circulating a liquid composition throughout a wellbore comprising: providing a liquid composition containing the copolymer of claim 10 and circulating the liquid composition within said wellbore.

24. A method of circulating a liquid composition throughout a wellbore comprising: circulating within said wellbore a liquid composition according to claim 20.

* * * * *